United States Patent
Sly et al.

(10) Patent No.: US 11,714,098 B2
(45) Date of Patent: Aug. 1, 2023

(54) ACOUSTIC AIR DATA SYSTEMS

(71) Applicant: Rosemount Aerospace Inc., Burnsville, MN (US)

(72) Inventors: Jaime Sly, Savage, MN (US); Daniel W. Shannon, Glastonbury, CT (US); Brian Daniel Matheis, Lakeville, MN (US); Todd Anthony Ell, Savage, MN (US); William Kunik, Lakeville, MN (US); Sudarshan N. Koushik, West Hartford, CT (US)

(73) Assignee: Rosemount Aerospace Inc., Burnsville, MN (US)

( * ) Notice: Subject to any disclaimer, the term of this patent is extended or adjusted under 35 U.S.C. 154(b) by 1127 days.

(21) Appl. No.: 16/391,192

(22) Filed: Apr. 22, 2019

(65) Prior Publication Data
US 2020/0333371 A1  Oct. 22, 2020

(51) Int. Cl.

| | |
|---|---|
| *G01P 3/14* | (2006.01) |
| *E05F 15/40* | (2015.01) |
| *H04W 4/38* | (2018.01) |
| *B64D 43/02* | (2006.01) |
| *G01P 1/00* | (2006.01) |

(52) U.S. Cl.
CPC .............. *G01P 3/14* (2013.01); *B64D 43/02* (2013.01); *E05F 15/40* (2015.01); *H04W 4/38* (2018.02); *G01P 1/06* (2013.01)

(58) Field of Classification Search
None
See application file for complete search history.

(56) References Cited

U.S. PATENT DOCUMENTS

| | | | |
|---|---|---|---|
| 4,112,756 | A | 9/1978 | MacLennan et al. |
| 4,143,548 | A | 3/1979 | Graewe et al. |
| 9,121,860 | B1 | 9/2015 | Cronyn |
| 2012/0118037 | A1 | 5/2012 | Leblond et al. |
| 2012/0173191 | A1 | 7/2012 | Moeller |

FOREIGN PATENT DOCUMENTS

| | | | | |
|---|---|---|---|---|
| EP | 3159700 A1 | * | 4/2017 | ............. G01D 11/00 |
| FR | 2948458 A1 | | 1/2011 | |
| FR | 2974908 A1 | | 11/2012 | |
| JP | S5486199 A | | 7/1979 | |
| WO | WO-2013179202 A2 | * | 12/2013 | ............. G01K 11/22 |
| WO | 2016/123746 A1 | | 8/2016 | |

OTHER PUBLICATIONS

Extended European search report issued in corresponding EP application No. 19214956.5, dated Jun. 26, 2020.

* cited by examiner

*Primary Examiner* — Jamel E Williams
(74) *Attorney, Agent, or Firm* — Locke Lord LLP; Daniel J. Fiorello; Gabrielle L. Gelozin

(57) ABSTRACT

An ultrasonic air data system can include a pole having a length longer than a boundary layer thickness of a boundary layer flow such that at least a distal end of the pole is configured to extend outwardly from an aircraft surface to be at least partially outside of the boundary layer flow. The system can include a transmitter disposed on or in the pole at or near the distal end of the pole such that the transmitter is located at least partially outside of the boundary layer flow when in use, wherein the transmitter is configured to output a transmitter signal. The system can include one or more receivers disposed downstream of the pole as defined by the boundary layer flow and configured to receive the transmitter signal.

18 Claims, 1 Drawing Sheet

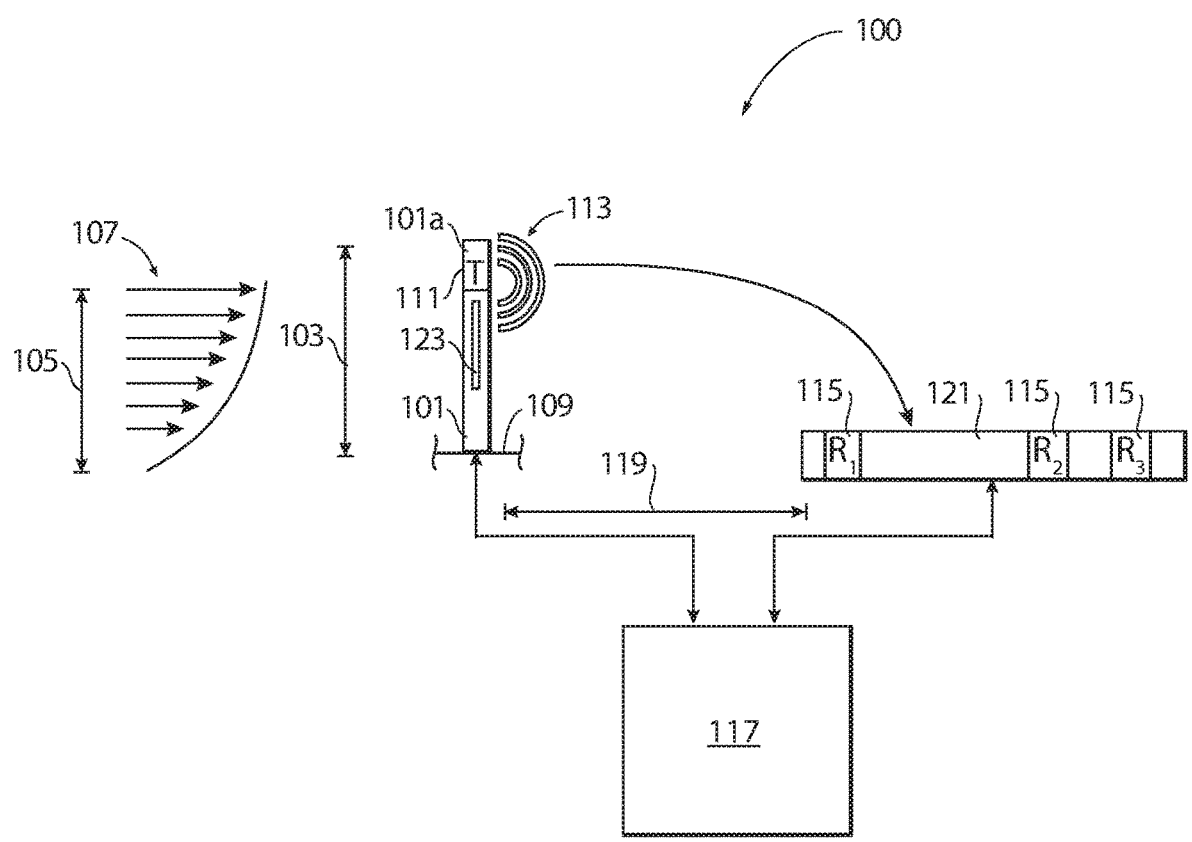

ACOUSTIC AIR DATA SYSTEMS

BACKGROUND

1. Field

This disclosure relates to air data system, more specifically to acoustic air data systems (e.g., ultrasonic airspeed, temperature, and/or direction systems).

2. Description of Related Art

Aircraft air data systems can utilize ultrasonic sensing for generating airspeed, temperature (e.g., through the speed of sound), and flow direction (e.g., AOA or AOS depending on installation). Performance of an ultrasonic air data system that utilizes an ultrasonic transmitter and an array of receivers and a time-of-flight measurement is directly dependent on a number of factors. The frequency of the sound wave, the distance the sound wave has to travel, the speed of sound of the medium in which it's traveling through, the attenuation of the sound due to a number of factors, and the relative wind speed and direction. Measurement principles such as the sampling rate and the accuracy of any estimation algorithms and calibration are also part of a total performance of this system.

Existing transmitters are directional and can require a horn structure in order for the transmitter signal to propagate to the receivers. Also, velocity and temperature gradients can attenuate the signal, so existing flush mounting may require complex calibration and a high signal strength.

Such conventional methods and systems have generally been considered satisfactory for their intended purpose. However, there is still a need in the art for improved acoustic air data systems. The present disclosure provides a solution for this need.

SUMMARY

An ultrasonic air data system can include a pole having a length longer than a boundary layer thickness of a boundary layer flow such that at least a distal end of the pole is configured to extend outwardly from an aircraft surface to be at least partially outside of the boundary layer flow. The system can include a transmitter disposed on or in the pole at or near the distal end of the pole such that the transmitter is located at least partially outside of the boundary layer flow when in use, wherein the transmitter is configured to output a transmitter signal. The system can include one or more receivers disposed downstream of the pole as defined by the boundary layer flow and configured to receive the transmitter signal.

The system can include a controller configured to receive one or more signals from the one or more receivers and/or to operate the transmitter (e.g., as a function of one or more received signals). The controller can include any suitable hardware and/or software module(s) as appreciated by those having ordinary skill in the art in view of this disclosure.

In certain embodiments, the length of the pole can be between about 1 inch and about 5 inches. Any other suitable length is contemplated herein, and can be selected based on the application (e.g., as a function of a maximum boundary layer thickness based on a predetermined aircraft maximum speed or cruise speed).

The transmitter can be configured to face backward along the aircraft for providing at least one of reduced susceptibility to icing, optimized directivity towards the one or more receivers, or extension of the signal just outside of the boundary layer. An axial distance between the pole and the one or more receivers can be defined based on at least one of a frequency of the transmitter signal, a transmitter efficiency, and a maximum sound pressure level output.

In certain embodiments, the transmitter can be configured to vibrate radially with compression of the pole. The transmitter can be configured to vibrate axially or both axially and radially. Any suitable vibration is contemplated herein.

In certain embodiments, the system can include one or more receivers upstream of the pole. Any other suitable location is contemplated herein.

The one or more receivers can include a plurality of receivers. The plurality of receivers can be installed on a single plate (e.g., flush mounted to the aircraft), or any suitable number can be mounted individually to the aircraft. Any suitable pattern for a plurality of receivers as appreciated by those having ordinary skill in the art is contemplated herein.

In certain embodiments, the pole can include a heater configured to prevent icing (e.g., on the pole and/or transmitter). Any suitable heater (e.g., resistive) is contemplated herein.

In certain embodiments, the pole can extend outwardly perpendicular to the aircraft surface. Any other suitable angle of the pole relative to the aircraft surface is contemplated herein.

In accordance with at least one aspect of this disclosure, a transmitter assembly for an acoustic air data system can include a pole having a length longer than a maximum boundary layer thickness of a boundary layer flow on an aircraft of a predetermined cruise speed such that at least a distal end of the pole is configured to extend outwardly from an aircraft surface to be at least partially outside of the boundary layer flow, and a transmitter disposed on or in the pole at or near a distal end of the pole such that the transmitter is located at least partially outside of the boundary layer flow when in use, wherein the transmitter is configured to output a transmitter signal. The pole and transmitter can include any suitable embodiment as disclosed herein (e.g., as described above).

In accordance with at least one aspect of this disclosure, a method for determining air data can include transmitting a transmitter signal outside of a boundary layer flow in a flow field into the boundary layer flow to be received by one or more receivers within the boundary layer flow. The method can include receiving a received signal at the one or more receivers. The method can include determining at least one of airspeed, temperature, and/or direction of the flow field based on at least one quality of the received signal compared to the transmitted signal. The at least one quality of the received signal includes time-of-flight between the transmitter and the one or more receivers.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic diagram of an embodiment of a system in accordance with this disclosure.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Certain embodiments described herein can be used to improve acoustic air data measurements, for example.

An ultrasonic air data system 100 can include a pole 101 having a length 103 longer than a boundary layer thickness 105 of a boundary layer flow 107 such that at least a distal end 101a of the pole 101 is configured to extend outwardly from an aircraft surface 109 to be at least partially outside of the boundary layer flow 107.

The system 100 can include a transmitter 111 disposed on or in the pole 101 at or near the distal end 101a of the pole 101 such that the transmitter 111 is located at least partially (e.g., entirely) outside of the boundary layer flow 107 when in use (e.g., at all flight conditions of an aircraft). The transmitter 111 can be configured to output an acoustic transmitter signal 113 (e.g., an ultrasonic signal). The transmitter signal 113 can be generated by any suitable acoustic signal generator (not shown) as appreciated by those having ordinary skill in the art (e.g., an ultrasonic signal generator). Any suitable signal frequency is contemplated herein.

The system 100 can include one or more receivers 115 disposed downstream of the pole 101 as defined by the boundary layer flow and configured to receive the transmitter signal 113. Any suitable number of receivers 115 is contemplated herein.

The system 100 can include a controller 117 configured to receive one or more signals from the one or more receivers 115 and/or to operate the transmitter 111 (e.g., as a function of one or more received signals). The controller 117 can be configured to control a frequency and/or amplitude of the transmitter signal 113 output by the transmitter 111 The controller 117 can include any suitable hardware and/or software module(s) as appreciated by those having ordinary skill in the art in view of this disclosure.

In certain embodiments, the length 103 of the pole 101 can be between about 1 inch and about 5 inches. Any other suitable length is contemplated herein, and can be selected based on the application (e.g., as a function of a maximum boundary layer thickness based on a predetermined aircraft maximum speed or cruise speed).

The transmitter 111 can be configured to face backward (e.g., in the downstream direction) along the aircraft for providing at least one of reduced susceptibility to icing, optimized directivity towards the one or more receivers 115, or extending the signal 113 just outside of the boundary layer 107. An axial distance 119 between the pole 101 and the one or more receivers 115 can be defined based on at least one of a frequency of the transmitter signal 113, a transmitter efficiency, and a maximum sound pressure level output, for example. Any other suitable factors for setting axial distance 119 are contemplated herein.

In certain embodiments, the transmitter 111 can be configured to vibrate only radially (inward and outward) with compression of the pole. The transmitter 111 can be configured to vibrate axially, or both axially and radially, for example. Any suitable vibration is contemplated herein.

In certain embodiments, the system 100 can include one or more receivers 115 upstream of the pole 101. Any other suitable location is contemplated herein. As shown, the one or more receivers 115 can include a plurality of receivers 115. The plurality of receivers 115 can be installed on a single plate 121 (e.g., flush mounted to the aircraft), or any suitable number can be mounted individually to the aircraft. Any suitable pattern for a plurality of receivers 115 as appreciated by those having ordinary skill in the art is contemplated herein.

In certain embodiments, the pole 101 can include a heater 123 configured to prevent icing (e.g., on the pole 101 and/or transmitter 111). Any suitable heater (e.g., resistive) is contemplated herein. In certain embodiments, the heater 123 can be controlled by the controller 117 as a function of any suitable variable, such as temperature or ice formation detection.

In certain embodiments, as shown the pole 101 can extend outwardly perpendicular to the aircraft surface 109. Any other suitable angle (e.g., 45 degrees) of the pole 101 relative to the aircraft surface 109 is contemplated herein. The angle may be a function of axial distance of the one or more receivers 115 (e.g., and/or plate 121) to the pole 101 and/or pole length 103. In certain embodiments, the pole 101 could be include a swept-back shape, (e.g., straight or curved).

In accordance with at least one aspect of this disclosure, a transmitter assembly for an acoustic air data system can include a pole (e.g., 101) having a length (e.g., 103) longer than a maximum boundary layer thickness of a boundary layer flow on an aircraft of a predetermined cruise speed such that at least a distal end of the pole is configured to extend outwardly from an aircraft surface to be at least partially outside of the boundary layer flow, and a transmitter (e.g., 111) disposed on or in the pole at or near a distal end of the pole such that the transmitter is located at least partially outside of the boundary layer flow when in use, wherein the transmitter is configured to output a transmitter signal. The pole and transmitter can include any suitable embodiment as disclosed herein (e.g., as described above).

In accordance with at least one aspect of this disclosure, a method for determining air data can include transmitting a transmitter signal outside of a boundary layer flow in a flow field into the boundary layer flow to be received by one or more receivers within the boundary layer flow. The method can include receiving a received signal at the one or more receivers. The method can include determining at least one of airspeed, temperature, and/or direction of the flow field based on at least one quality of the received signal compared to the transmitted signal. The at least one quality of the received signal includes time-of-flight between the transmitter and the one or more receivers.

Embodiments can include a transmitter that is above a boundary layer so that more accurate measurements can be made of free stream conditions. Embodiments can include a source that has a more direct path to the receivers, and signal shaping (e.g., with horn) can be reduced or eliminated as a result. Embodiments can utilize a lower power transmitter than that required in existing systems.

Certain embodiments can account for icing by having the transmitter rear facing so icing would only build up on a non-functional side of the pole, for example. Certain embodiments can have a high enough amplitude sound vibration to shake off icing, and/or a heater to heat the transmitter.

Embodiments allow the distance between the transmitter and receivers to be increased, which can improve resolution of measurements. Existing flush mounted systems cannot as spread apart due to size restrictions as well as signal attenuation issues.

Certain embodiments of a controller (e.g., 117 disclosed above) can include any suitable processing hardware and/or software modules for resolving the airspeed, direction, and speed of sound components through signals received by the one or more receivers (e.g., an array of downstream receivers). In certain embodiments, the transmitter and receivers can be electrically connected to a single processing and controller unit (e.g., controller 117).

Certain embodiments allow the majority of the atmospheric measurement to be taken in a region of airflow that is easily calibrated as appreciated by those having ordinary skill in the art in view of this disclosure. The optimal distance to the receiver array could be defined based on the frequency of the generated source, transmitter efficiency, and max sound pressure level output, in addition to the required performance of the airspeed measurement.

Certain embodiments provide an advantage to a flush installation in that omni-directivity of a transmitter is not required, which at higher frequencies is more difficult and requires a horn or similar features. Embodiments can also reduce the effect of the velocity gradient in the boundary layer which aids in improving measurement accuracy and resolution.

As will be appreciated by those skilled in the art, aspects of the present disclosure may be embodied as a system, method, or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An ultrasonic air data system, comprising:
    a pole having a length longer than a boundary layer thickness of a boundary layer flow such that at least a distal end of the pole is configured to extend outwardly from an aircraft surface to be at least partially outside of the boundary layer flow;
    a transmitter disposed on or in the pole at or near the distal end of the pole such that the transmitter is located at least partially outside of the boundary layer flow when in use, wherein the transmitter is configured to output a transmitter signal; and
    one or more receivers disposed downstream of the pole as defined by the boundary layer flow and configured to receive the transmitter signal, wherein the length of the pole is between about 1 inch and about 5 inches.

2. The system of claim 1, further comprising a controller configured to receive one or more signals from the one or more receivers and/or to operate the transmitter.

3. The system of claim 1, wherein the transmitter is configured to face backward along the aircraft for providing at least one of reduced susceptibility to icing, optimized directivity towards the one or more receivers, or extension of the signal just outside of the boundary layer.

4. The system of claim 1, wherein an axial distance between the pole and the one or more receivers is defined based on at least one of a frequency of the transmitter signal, a transmitter efficiency, and a maximum sound pressure level output.

5. The system of claim 1, wherein the transmitter is configured to vibrate radially with compression of the pole.

6. The system of claim 1, further comprising one or more receivers upstream of the pole.

7. The system of claim 1, wherein the one or more receivers include a plurality of receivers.

8. The system of claim 7, wherein the plurality of receivers are installed on a single plate.

9. The system of claim 1, wherein the pole includes a heater configured to prevent icing.

10. The system of claim 1, wherein the pole extends outwardly perpendicular to the aircraft surface.

11. A transmitter assembly for an acoustic air data system, comprising:
    a pole having a length longer than a maximum boundary layer thickness of a boundary layer flow on an aircraft of a predetermined cruise speed such that at least a distal end of the pole is configured to extend outwardly from an aircraft surface to be at least partially outside of the boundary layer flow; and
    a transmitter disposed on or in the pole at or near the distal end of the pole such that the transmitter is located at least partially outside of the boundary layer flow when in use, wherein the transmitter is configured to output a transmitter signal, wherein the length of the pole is between about 1 inch and about 5 inches.

12. The assembly of claim 11, wherein the transmitter is configured to face backward along the aircraft for providing at least one of reduced susceptibility to icing, optimized directivity towards the one or more receivers, or extension of the signal just outside of the boundary layer.

13. The assembly of claim 11, wherein the transmitter can be configured to vibrate radially with compression of the pole.

14. The assembly of claim 11, wherein the pole includes a heater configured to prevent icing.

15. A method for determining air data, comprising:
    transmitting a transmitter signal outside of a boundary layer flow in a flow field into the boundary layer flow to be received by one or more receivers within the boundary layer flow wherein the transmitter is disposed on or in a pole having a length longer than a maximum boundary layer thickness of a boundary layer flow on an aircraft of a predetermined cruise speed such that at least a distal end of the pole is configured to extend outwardly from an aircraft surface to be at least partially outside of the boundary layer flow, wherein the length of the pole is between about 1 inch and about 5 inches.

16. The method of claim 15, further comprising receiving a received signal at the one or more receivers.

17. The method of claim 16, further comprising determining at least one of airspeed, temperature, and/or direction of the flow field based on at least one quality of the received signal compared to the transmitted signal.

18. The method of claim 17, wherein the at least one quality of the received signal includes time-of-flight between the transmitter and the one or more receivers.

* * * * *